United States Patent
Olds et al.

(10) Patent No.: US 7,845,247 B2
(45) Date of Patent: Dec. 7, 2010

(54) SHIFT FORK ACTUATION SYSTEM FOR CONTROL OF SYNCHRONIZER POSITION

(75) Inventors: David A. Olds, Fenton, MI (US); Richard T. Tamba, Castle Hill (AU)

(73) Assignee: GM Global Technology Operations, Inc., Detroit, MI (US)

( * ) Notice: Subject to any disclaimer, the term of this patent is extended or adjusted under 35 U.S.C. 154(b) by 445 days.

(21) Appl. No.: 11/871,265

(22) Filed: Oct. 12, 2007

(65) Prior Publication Data

US 2008/0295634 A1 Dec. 4, 2008

Related U.S. Application Data

(60) Provisional application No. 60/940,822, filed on May 30, 2007.

(51) Int. Cl.
F16H 3/08 (2006.01)
(52) U.S. Cl. .................. 74/333; 74/335; 74/473.36
(58) Field of Classification Search .................. 74/333, 74/335, 473.35, 473.36
See application file for complete search history.

(56) References Cited

U.S. PATENT DOCUMENTS

| | | | | |
|---|---|---|---|---|
| 6,000,294 | A * | 12/1999 | Jackson et al. | 74/335 |
| 2002/0078787 | A1* | 6/2002 | Comfort et al. | 74/524 |
| 2005/0274218 | A1* | 12/2005 | Birkel et al. | 74/473.24 |
| 2007/0056399 | A1* | 3/2007 | Barnes et al. | 74/335 |
| 2008/0053261 | A1* | 3/2008 | Wright | 74/473.11 |
| 2008/0296112 | A1* | 12/2008 | Kauffeldt et al. | 192/3.57 |
| 2009/0241714 | A1* | 10/2009 | Sowul et al. | 74/473.11 |

FOREIGN PATENT DOCUMENTS

| | | |
|---|---|---|
| DE | 4038170 A1 | 6/1992 |
| DE | 19756638 A1 | 6/1999 |
| DE | 19858321 A1 | 6/2000 |
| DE | 60010308 T2 | 5/2005 |

* cited by examiner

*Primary Examiner*—David M Fenstermacher
(74) *Attorney, Agent, or Firm*—Quinn Law Group, PLLC

(57) ABSTRACT

A shift fork actuation system includes an actuator housing defining a piston cavity and a piston assembly having three pistons with three different surface areas responsive to fluid pressure to establish positions of the piston assembly within the piston cavity. A stopping mechanism, such as a shoulder formed by the actuator housing at the interface of different bores in the piston cavity, interferes with one of the surface areas to prevent movement of one of the pistons past the stopping mechanism. A neutral position of a shift fork is established by interference of the piston assembly with the stopping mechanism. A slot in the piston assembly captures a finger extension from the shift rail to act as an anti-rotation feature, ensuring that a magnet embedded in the piston assembly as part of a sensor assembly is properly positioned.

17 Claims, 6 Drawing Sheets

SHIFT FORK ACTUATION SYSTEM FOR CONTROL OF SYNCHRONIZER POSITION

CROSS-REFERENCE TO RELATED APPLICATIONS

This application claims the benefit of U.S. Provisional Application 60/940,822, filed May 30, 2007, which is hereby incorporated by reference in its entirety.

TECHNICAL FIELD

The invention relates to a shift fork actuation system for controlling the positions of a synchronizer in an automated layshaft transmission.

BACKGROUND OF THE INVENTION

Layshaft transmissions typically use synchronizers to synchronize the speed of gears with a layshaft before engaging the gears with the layshaft to complete powerflow through the transmission. Synchronizers are moved by a hydraulically or mechanically actuated shift fork between a neutral position, in which an adjacent gear is not engaged with the layshaft, and an engaged position in which the gear is engaged with the layshaft. In the case of a dual synchronizer, there are two different engaged positions for two different gears mounted concentrically with the layshaft on either side of the synchronizer. Precise and rapid positioning of the synchronizer enables reliable and smooth shifting of the transmission.

SUMMARY OF THE INVENTION

A compact, fast-responding shift fork actuation system, especially suited for use on an automated layshaft transmission is provided. The shift fork actuation system includes an actuator housing defining a piston cavity and a piston assembly having three pistons each preferably aluminum alloy and each with a different surface area responsive to fluid pressure to establish different positions of the piston assembly within the piston cavity. A stopping mechanism, such as a shoulder formed by the actuator housing at the interface of different bores of the piston cavity, interferes with one of the pistons to prevent movement of the piston past the stopping mechanism. A shift fork operatively connects to the piston assembly. The three positions of the piston assembly correspond with different positions of the shift fork and the synchronizer connected thereto. Preferably, a neutral position of the synchronizer is established by the interference of the piston assembly with the stopping mechanism. In a preferred embodiment, there are four piston assemblies, each operatively connected with a different double synchronizer.

A first of the three pistons is an annular piston. The second and third pistons are integrally connected, cylindrical pistons with differing outer diameters forming a plug. A slot extends partially transversely through the plug between the second and third pistons. The shift fork actuation system also includes an elongated shift rail and a shift fork extending from the shift rail in operative engagement with the synchronizer. Preferably, the piston assembly is generally axially centered with respect to the shift rail, minimizing the length of hydraulic fluid paths to the piston assembly. A finger extension is spaced from the shift fork and extends from the shift rail into the slot such that movement of the pistons moves the finger extension to shift the synchronizer.

Preferably, a sensor assembly is provided that includes a magnet integrally connected to (e.g., embedded in) each piston assembly. The sensor assembly also includes a sensor pick-up positioned on the actuator housing in operative communication with the magnet. The sensor pickup is operable to generate an electrical signal corresponding with the position of magnet and thereby of the piston assembly and, most importantly, of the synchronizer. The finger extension contacts the integrally connected second and third pistons within the slot and minimizes rotation of the pistons within the cavity, thereby ensuring that the magnet is always properly positioned for operative communication with the sensor pick-up. Additionally, an optional biasing element such as a preloaded spring may be retained in an aperture in the connected second and third pistons within the slot to rest between the finger extension and the integrally connected second and third pistons to further reduce piston rotation and thereby ensure an accurate magnet position and corresponding signal generated by the sensor pickup.

The above features and advantages and other features and advantages of the present invention are readily apparent from the following detailed description of the best mode for carrying out the invention when taken in connection with the accompanying drawings.

DESCRIPTION OF THE PREFERRED EMBODIMENT

Figure 1:
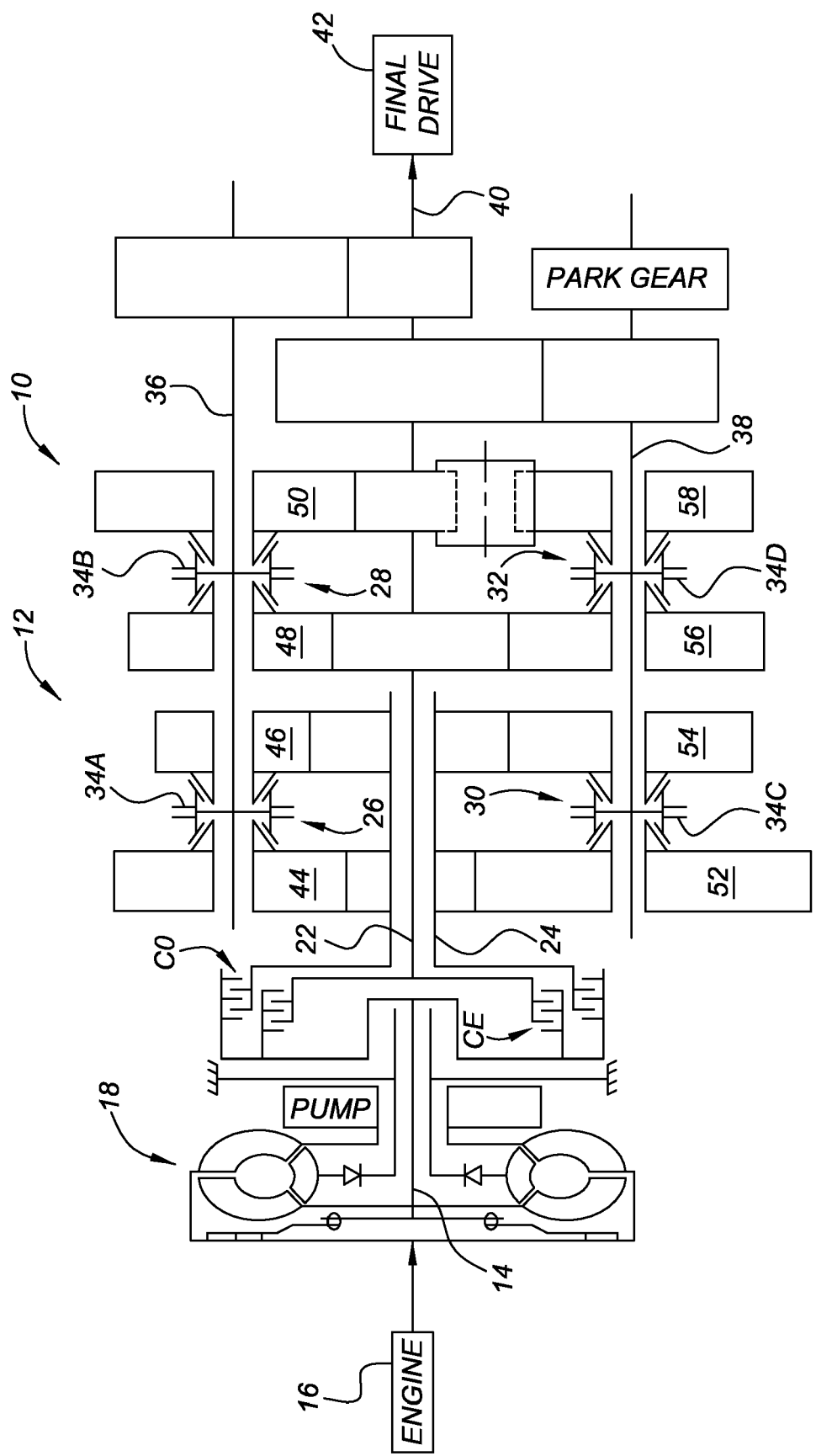
FIG. 1 is a schematic illustration of a powertrain with a dual clutch layshaft transmission having four dual synchronizers.
Figure 2:
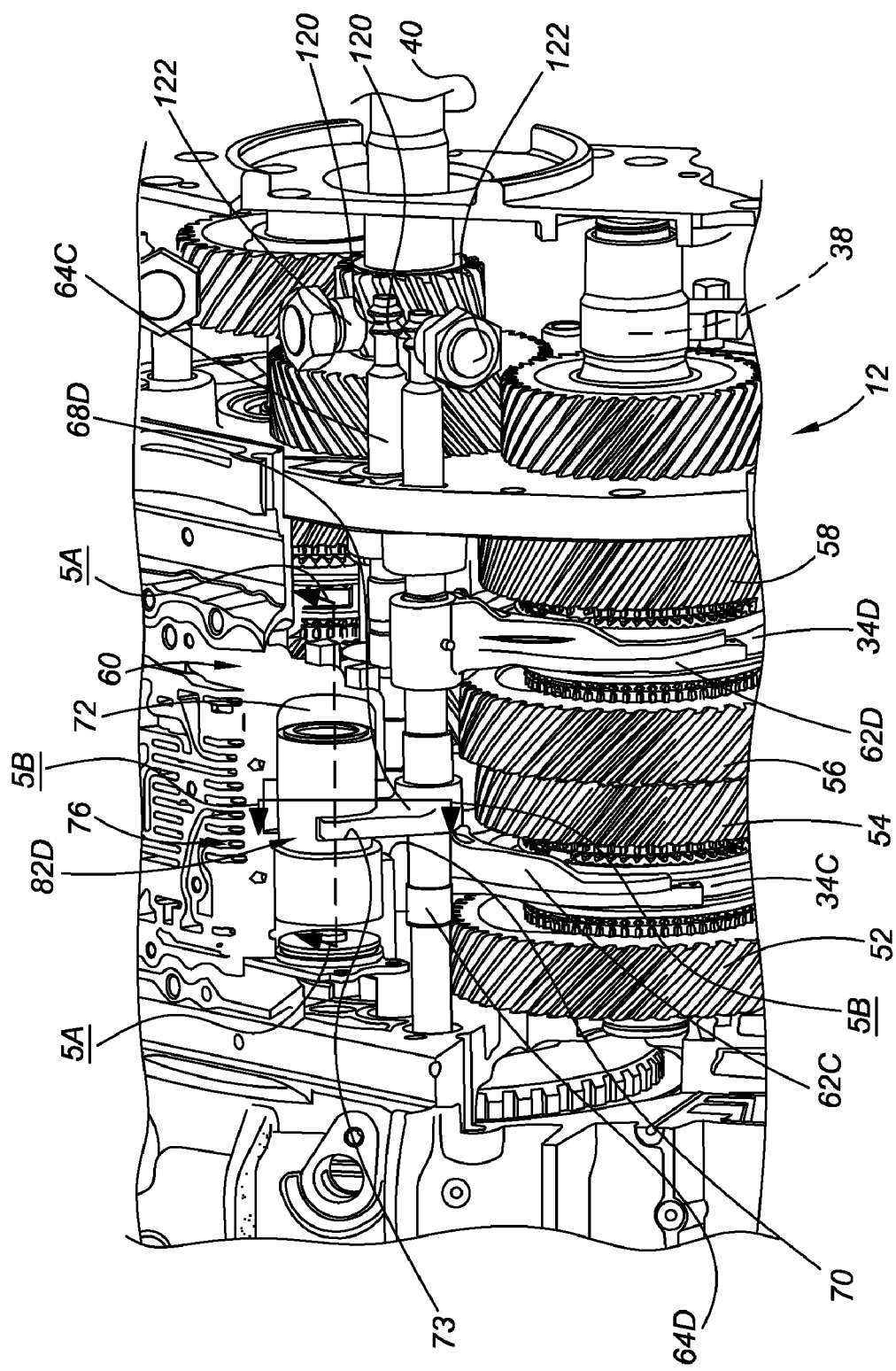
FIG. 2 is a schematic perspective illustration in fragmentary view of a shift fork actuation system (with a portion of an actuator housing cut away to show an actuator piston assembly) for controlling the position of the synchronizers in the transmission of FIG. 1.
Figure 3:
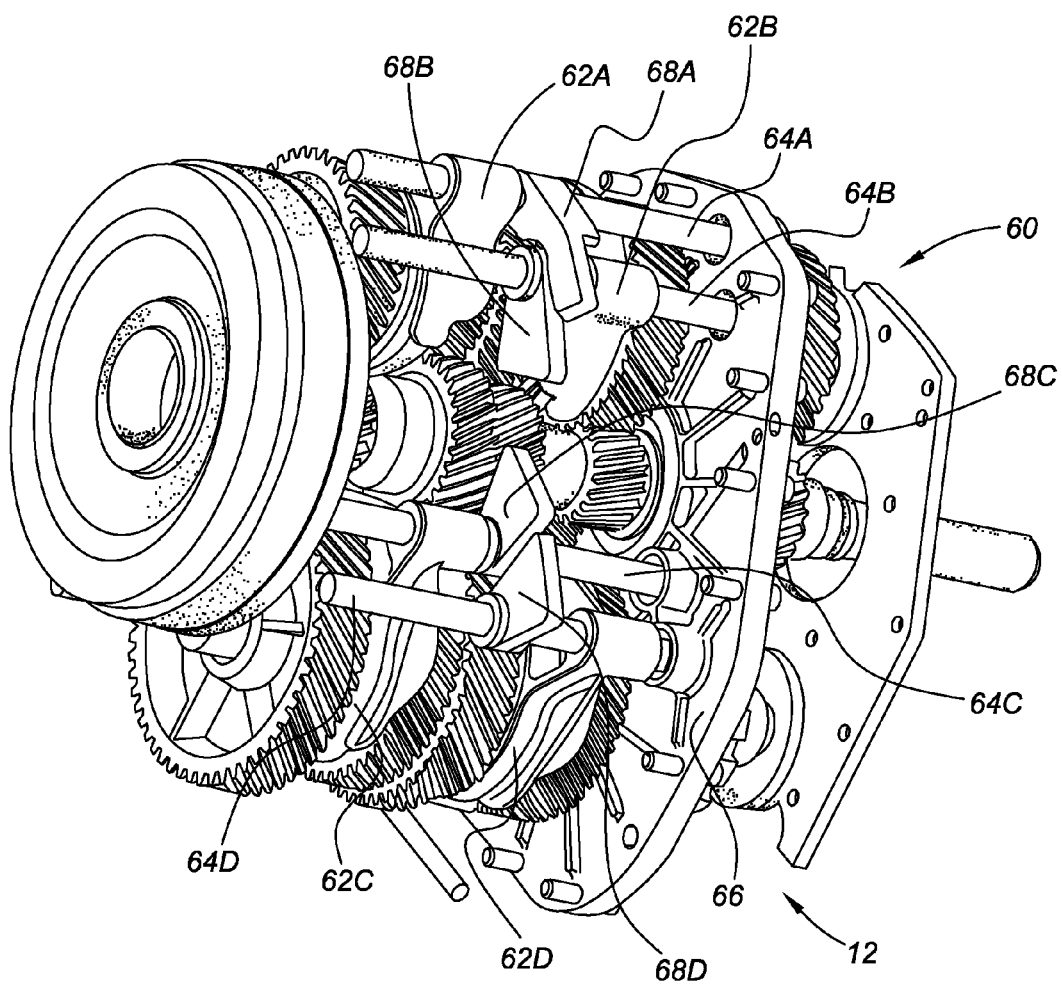
FIG. 3 is a schematic perspective illustration of the shift fork actuation system of FIG. 2 with the actuator piston assembly and actuator housing removed to show four shift rods with actuator finger extensions and shift forks.

Referring to the drawings, wherein like reference numbers refer to like components, FIG. 1 shows a powertrain 10 having a transmission 12 with an input shaft 14 connected to an engine 16 through a torque converter 18. Dual input clutches CE, CO are operatively connected to the input shaft 14 and are alternately selectively engagable to connect the input shaft 14 to a first intermediate shaft 22 and a second intermediate shaft 24, respectively. Four double synchronizers 26, 28, 30 and 32 have synchronizer sleeves 34A, 34B, 34C and 34D that are selectively movable by respective shift forks (shown and described in FIGS. 2 and 3) to selectively engage different gears with respective countershafts 36, 38 (also referred to herein as layshafts) to permit dynamic shifting, i.e., preselection of a gear to engage the gear with the respective layshaft prior to the layshaft carrying a torque load, i.e., prior to engagement of the input clutch CO or CE, as is known. Each respective shift fork, as described in FIGS. 2 and 3, is selectively movable to move a respective one of the synchronizer sleeves 34A, 34B, 34C and 34D to a neutral position (shown in FIG. 1), in one direction (i.e., to the left) to engage a gear to the left with a respective layshaft, and in an opposing direction (i.e., to the right) to engage another gear to the right with the layshaft, to establish different powerflow paths from the input member 14 to an output member 40 to deliver torque at different speed ratios to a final drive mechanism 42 through the transmission 12. For example, when synchronizer sleeve 34A is shifted to the left, gear 44 is connected for common rotation with countershaft 36. When synchronizer sleeve 34A is shifted to the right, gear 46 is connected for common rotation with countershaft 36. When synchronizer sleeve 34B is shifted to the left, gear 48 is connected for common rotation with countershaft 36. When synchronizer sleeve 34B is shifted to the right, gear 50 is connected for common rotation with countershaft 36. When synchronizer sleeve 34C is shifted to the left, gear 52 is connected for common rotation with countershaft 38. When synchronizer sleeve 34C is shifted to the right, gear 54 is connected for common rotation with countershaft 38. When synchronizer sleeve 34D is shifted to the left, gear 56 is connected for common rotation with countershaft 38. When synchronizer sleeve 34D is shifted to the right, gear 58 is connected for common rotation with countershaft 38. Each synchronizer sleeve 34A, 34B, 34C and 34D is independently shiftable from the others, to selectively engage the adjacent gears with the respective countershafts 36, 38.

Referring now to FIGS. 2 and 3, the transmission 12 is shown with a shift fork actuation system 60 that has shift forks engaged with each of the sleeves. Shift forks 62A, 62B, 62C and 62D are mounted to separate, generally parallel shift rails 64A, 64B, 64C and 64D, which in turn are supported by low resistance linear ball bearings (not shown) at the center support 66 and the case of the transmission 12. In FIG. 2, shift fork 62C is operatively engaged with synchronizer sleeve 34C and shift fork 62D is operatively engaged with synchronizer sleeve 34D. In FIG. 2, the gears 52, 54, 56, and 58 that are selectively engagable for common rotation with the countershaft 38 are also shown.

Each shift rail 64A, 64B, 64C, and 64D has a respective finger extension 68A, 68B, 68C and 68D mounted thereto spaced from and extending in a different direction than the respective shift fork 62A, 62B, 62C and 62D on the shift rail. The finger extensions 68A, 68B, 68C, and 68D are permanently attached to the shift rails 64A, 64B, 64C, and 64D, such as by laser welding. The shift rails 64A, 64B, 64C, and 64D move with the forks 62A, 62B, 62C, and 62D and the finger extensions 68A, 68B, 68C, and 68D. Each finger extension 68A, 68B, 68C and 68D extends through an opening 70 in an actuator housing 72 and into a slot 73 in a piston assembly (piston assembly 82D shown, three other like piston assemblies being housed in separate piston cavities 78A, 78B, and 78C shown in FIG. 6). The piston assemblies 82A-82D and the housing 72 may be referred to as an actuator assembly 76. Force is applied directly to the finger extensions 68A, 68B, 68C, and 68D by the respective actuator piston assemblies (actuator piston assembly 82D shown in FIGS. 4 and 5A and actuator piston assembly 82A shown in FIG. 6). Ribbing and material specifications for the actuator finger extensions 68A, 68B, 68C, and 68D may be developed through the use of finite element analysis.

Figure 6:
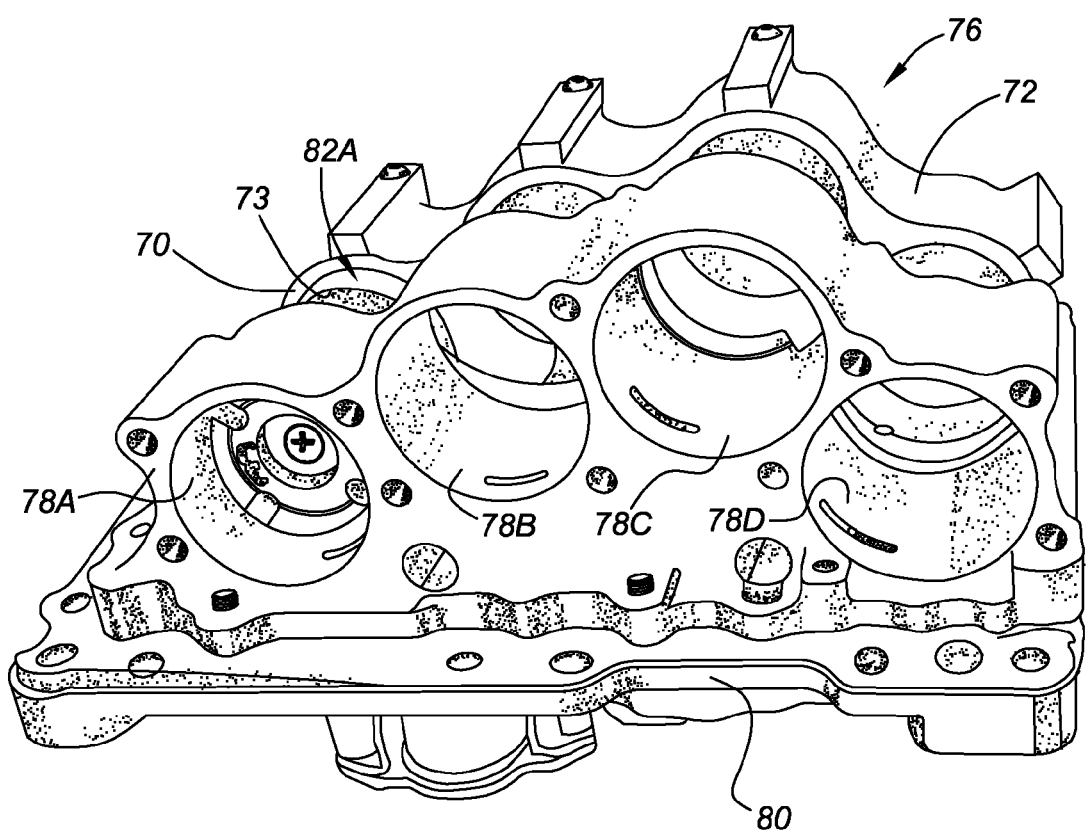
FIG. 6 is a schematic perspective illustration of the actuator housing of FIGS. 2, 4 and 5A.

Referring to FIG. 6, the actuator assembly 76 is shown in more detail. The actuator housing 72 houses the four separate piston cavities 78A, 78B, 78C, and 78D, each selectively fed pressurized fluid on either end by a valve body assembly 80 to selectively move different pistons of each respective different piston assembly (only piston assembly 82A shown in FIG. 6) to determine the position of the respective shift fork 62A, 62B, 62C, and 62D shown in FIG. 3 operatively engaged with the respective piston assembly through the opening 70.

Figure 5A:
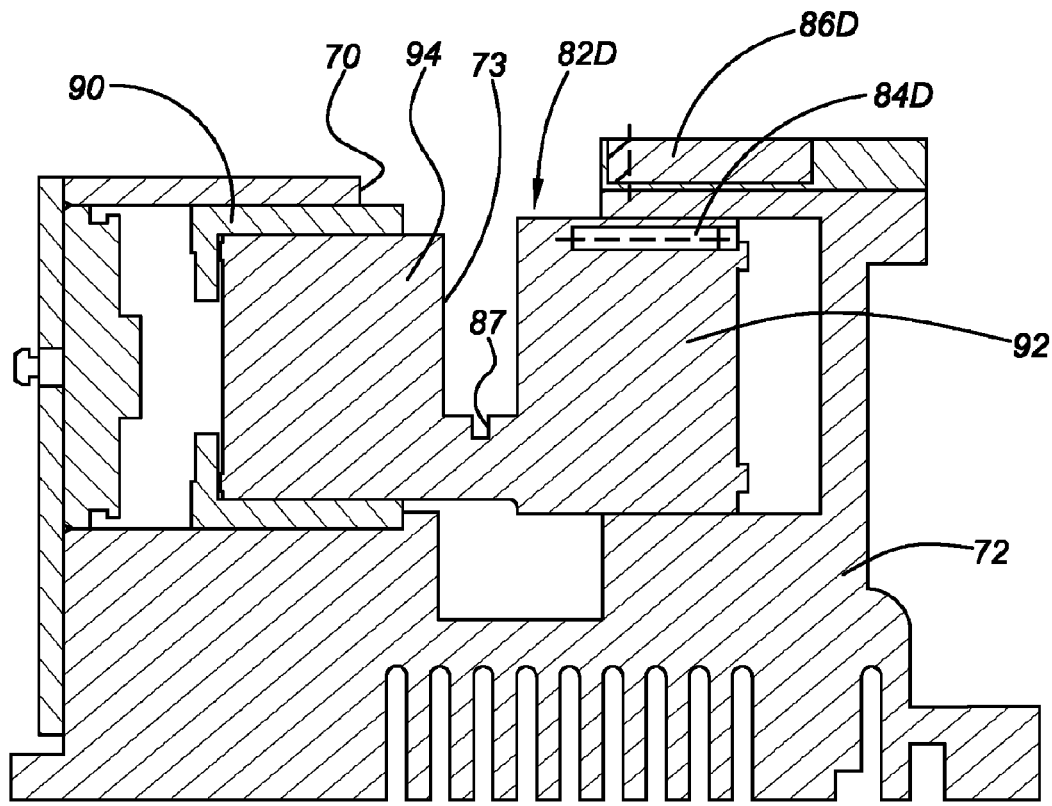
FIG. 5A is a schematic cross-sectional illustration of the shift fork actuation system taken at the arrows 5A-5A shown in FIG. 2 and rotated 180 degrees, showing a magnet embedded in the piston assembly and a sensor mechanism secured to the actuator housing.

Referring to FIG. 5A, a position sensor assembly includes a magnet embedded in each respective piston assembly (magnet 84D shown embedded in piston assembly 82D). As shown in FIG. 5A, the position sensor assembly also includes a sensor pickup 86D, in the form of a Hall Effect sensor, secured to the actuator housing 72, and directly aligned with the piston assembly 82D. The magnitude of an electric current in the sensor pickup 86D is in relation to the position of the magnet 84D. Because the position of the piston assembly 82D is directly related to the position of the corresponding synchronizer shift fork 62D of FIG. 3, the magnet 84D and sensor pickup 86D provide positioning feedback related to the time to engagement of a selected gear, allowing hydraulic pressure to be controlled to prevent abrupt shifting. Like magnets and sensor pickups are positioned in like manner and function the same as those shown with respect to piston assembly 82D to provide position feedback of the other piston assemblies. In lieu of being embedded in the piston assemblies, the magnets 84D could be secured to the outer surface of the respective piston assemblies, or in some other way made integral with the piston assemblies for rotation therewith. Many other types of sensor assemblies known in the art may be employed in lieu of a Hall Effect sensor in combination with a magnet.

Referring to FIGS. 2 and 5A, the slot 73 in the piston assembly 82D extends only partway through the piston assembly 82D. The finger extension 68D (see FIG. 2) traverses an opening 70 in the actuator housing 72 and substantially occupies the entire slot 73 to prevent the piston assembly 82D from rotating. Thus, the slot 73 acts as both a mechanism to transfer movement from the finger extension 68D to the piston assembly 82D and as an anti-rotation feature for the piston assembly 82D that ensures that the magnet 84D is positioned on a portion of the circumference of the piston cavity 78D that is always in general alignment with the sensor pickup 86D (shown in FIG. 5A).

Figure 4:
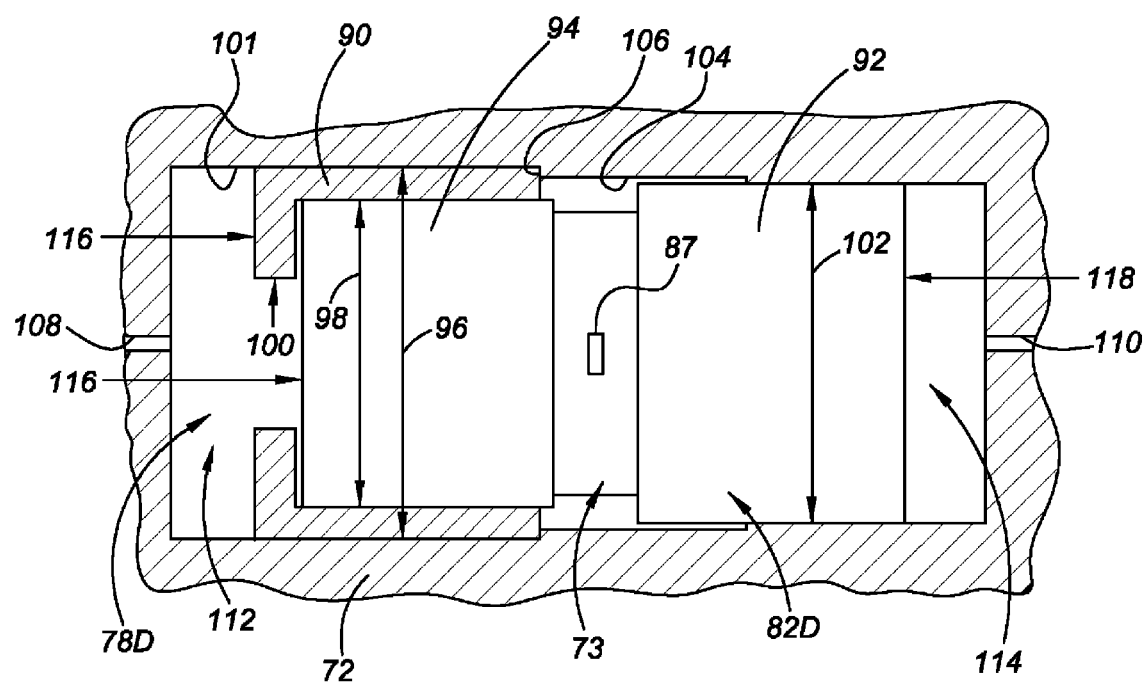
FIG. 4 is a schematic plan view of one of the piston assemblies in a piston cavity of the actuator housing of FIG. 2.

Referring to FIG. 4, one of the piston assemblies 82D is shown in greater detail nested within piston cavity 78D of the actuator housing 72. The piston assembly 82D includes three pistons 90, 92 and 94, each preferably of an aluminum alloy. The first piston 90 is an annular piston with an outer diameter 96 and an inner diameter 98 at an inner bore that extends substantially the length of the piston 90, ending at a portion having an end opening 100. The outer diameter 96 fits within a first bore 101 of the piston cavity 78D. The second piston 92 has an outer diameter 102 that fits within a second bore 104 of the piston cavity 78D. The outer diameter 96 of the first piston 90 is larger than the second bore 104, and the piston 90 is mechanically prevented from traveling further to the right than shown in FIG. 4 by a shoulder 106 of the actuator housing 72 formed where the first and second bores 101, 104 interface. The second piston 92 is connected for movement with the third piston 94, with the slot 73 formed therebetween.

Figure 5B:
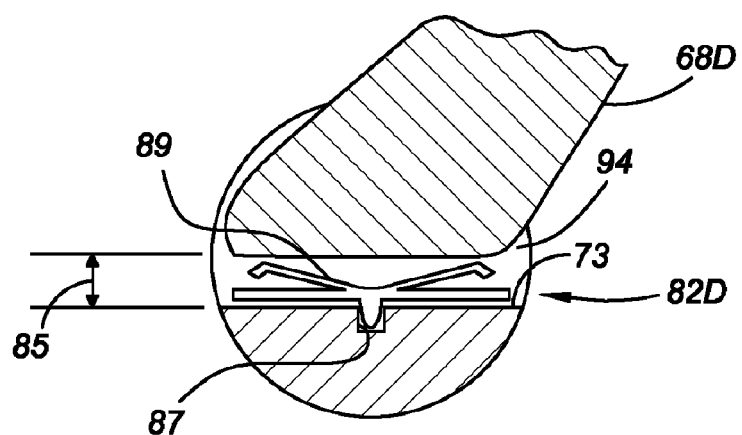
FIG. 5B is a schematic partially cross-sectional and fragmentary illustration taken at the arrows 5B-5B shown in FIG. 2 and rotated 180 degrees, with an optional spring held within a slot of the piston assembly and showing an actuator finger extension within the slot.

Referring to FIG. 5B, the finger extension 68D is shown in the slot 73 of the connected pistons 92, 94 (only piston 94 shown in the cross-section of the piston assembly 82D; piston 90 and housing 72 not shown for purposes of clarity in the drawing). Optionally, in order to reduce a clearance 85 between the finger extension 68D and the piston assembly 82D at the slot 73, an aperture 87 is provided in the joined pistons 92, 94 (see FIG. 5A; aperture 87 also shown in FIG. 4) and retains a biasing element 89 such as a preloaded spring (biasing element 89 not in cross-sectional view in FIG. 5B and not shown in FIG. 5A for purposes of clarity in the drawing). The biasing element 89 further reduces rotation of the piston assembly 82D of FIG. 4 to further ensure proper alignment of the sensor pickup 86D and the magnet 84D shown in FIG. 5A to ensure an accurate magnet position and corresponding signal generated by the sensor pickup 86D. The biasing element could be made of any material, such as plastic, rubber, spring steel, stainless steel, or a combination of these.

As shown, channels 108, 110 allow hydraulic fluid to be fed to or exhausted from the portions of the piston cavity 78D to the left of the piston 94, referred to as chamber 112, and to the right of piston 92, referred to as chamber 114. The pistons 90, 92, 94 are in the positions shown due to hydraulic pressure applied to both a first surface area 116 and a second surface area 118 and the finger extension 68D shown in FIG. 2 that extends in the slot 73 will be in a first position corresponding with a neutral position of the synchronizer sleeve 34D of FIG. 2. Because the neutral position is defined by the shoulder 106, neutral is a fixed, mechanically-precise position that prevents undesired partial engagement or drag of the synchronizer 32 of FIG. 1, as required for low spin losses and longer synchronizer life. If the fluid in chamber 114 is exhausted, the integrally connected pistons 92, 94 move to the right, with hydraulic pressure being applied to a first surface area 116 of piston 94, and the finger extension 68D extending in slot 73 will be in a second position in which the operatively connected synchronizer sleeve 34D moves to the right to engage the gear 58 with countershaft 38. If the fluid in chamber 112 is exhausted instead, hydraulic pressure acts on second surface area 118 and the piston 90 and the connected pistons 92, 94 move together to the left to a position corresponding with the third position of the synchronizer sleeve 34D of FIG. 1 in which the synchronizer sleeve 34D engages gear 56 for rotation with countershaft 36. Thus, the hydraulic fluid passages from the valve body 80 (shown in FIG. 6) to the piston assembly 82D are relatively short, especially in comparison to systems having actuator pistons at the ends of the shift rails. Because the piston assemblies are not at the ends of the shift rails 64A-64D (see, e.g., piston assembly 82D in FIG. 2), the overall axial length of the actuator system 60 is shorter compared to such systems. Additionally, the shorter path for pressurized fluid enables quick response time of the actuators and enables a compact arrangement of the shift fork actuator system 60.

Referring again to FIG. 2, a shift rail detent 120 is shown formed at the end of each respective shift rail (shown in shift rails 64C and 64D, but also formed on shift rails 64A and 64B shown in FIG. 3). A neutral detent pin 122 is associated with each respective detent 120 and has a spring-biased ball that is captured in the respective detent 120 when the respective shift rail 64A, 64B, 64C, 64D is in the neutral position. When the shift rail moves to either engaged position (i.e., to the right or to the left), the ball of the detent pin 122 is snapped over a ridge defining the detent 120, helping to quickly move the connected respective shift fork and synchronizer to the desired engaged position. The detents 120 as well as the mechanical shoulder 106 of each piston assembly (see FIG. 4) help to ensure a neutral position of the piston assembly, such as piston assembly 82D, without requiring pressurization of the piston assembly.

While the best mode for carrying out the invention has been described in detail, those familiar with the art to which this invention relates will recognize various alternative designs and embodiments for practicing the invention within the scope of the appended claims.

The invention claimed is:

1. A shift fork actuation system for controlling synchronizer position in an automated transmission, comprising:
  an actuator housing defining at least one piston cavity having a first portion with a first diameter and a second portion with a second diameter smaller than the first diameter such that the actuator housing forms a shoulder at an interface of the first and second portions;
  a piston assembly movable within said at least one piston cavity and characterized by at least one outer diameter; wherein the outer diameter is larger than the second diameter such that the shoulder stops movement of the piston assembly into the second portion;
  wherein the piston assembly is operatively connected to the synchronizer and wherein movement of the piston assembly establishes different positions of the synchronizer, including a neutral position corresponding with the piston assembly being stopped at the shoulder;
  a piston sensor assembly including:
    a magnet integrally connected to the piston assembly to move therewith; and
    a sensor pick-up positioned on the actuator housing and configured to sense the position of the magnet and provide a signal corresponding with the position of the magnet to provide feedback of the piston assembly position and thereby of the corresponding synchronizer position.

2. The shift fork actuation of claim 1, wherein the piston assembly includes:
  a first annular piston movable within the first portion in response to fluid pressure on a first surface area thereof, the first surface area being defined by an inner diameter and said at least one outer diameter of the first annular piston;
  a second piston with a second outer diameter defining a second surface area and movable within the second portion in response to fluid pressure on the second surface area;
  a third piston integrally connected for movement with the second piston and having a third diameter defining a third surface area; and wherein the third piston is movable within the inner diameter of the first piston in response to fluid pressure on the third surface area; wherein movement of the first, second and third pistons establishes respective different positions of the synchronizer, including the neutral position established by movement of the first piston.

3. The shift fork actuation system of claim 1, wherein the piston assembly has a slot; and further comprising:
  an elongated shift rail;
  a shift fork extending from the shift rail in operative engagement with the synchronizer; and
  a finger extension spaced from the shift fork and extending from the shift rail into the slot such that movement of the piston assembly moves the finger extension to shift the synchronizer to the different positions.

4. The shift fork actuation system of claim 3, wherein the slot extends only partially through the piston assembly such that the finger extension interferes with the piston assembly to reduce rotation of the piston assembly when the finger extension is in the slot.

5. The shift fork actuation system of claim 4, wherein the piston assembly has an aperture at the slot, and further comprising:
a biasing element extending in the aperture and retained by the piston assembly within the slot and substantially occupying a clearance between the piston assembly and the finger extension when the finger extension is in the slot to further reduce rotation of the piston assembly.

6. The shift fork actuation system of claim 4, wherein the piston assembly is generally axially centered with respect to the shift rail.

7. The shift fork actuation system of claim 1, wherein the piston assembly is an aluminum alloy.

8. A shift fork actuation system for controlling the position of a synchronizer, comprising:
an actuator housing defining a piston cavity;
a piston assembly having three pistons with three different surface areas responsive to fluid pressure to establish three positions of the piston assembly within the piston cavity; wherein a second and a third of the three pistons are integrally connected cylindrical pistons with differing outer diameters forming a plug with a slot extending partially transversely through the plug between the second and the third pistons;
a stopping mechanism interfering with one of the pistons to prevent movement of said one of the pistons past the stopping mechanism;
a shift fork operatively connected to the piston assembly; and
wherein the three positions of the piston assembly correspond with different positions of the shift fork.

9. The shift fork actuation system of claim 8, wherein the piston cavity has concentric bores of different diameters; and wherein the stopping mechanism is a shoulder of the piston cavity formed between the different bores.

10. The shift fork actuation system of claim 8, wherein a first of the pistons is an annular piston; and further comprising:
an elongated shift rail; wherein the shift fork extends from the shift rail in operative engagement with the synchronizer; and
a finger extension spaced from the shift fork and extending from the shift rail into the slot such that movement of the pistons moves the finger extension to shift the synchronizer to the three positions.

11. The shift fork actuation system of claim 10, further comprising:
a position sensor assembly including:
a magnet integrally connected with the piston assembly to move therewith; and
a sensor pick-up positioned on the actuator housing in operative communication with the magnet and configured to provide a signal corresponding with the position of the magnet and thereby of the piston assembly.

12. The shift fork actuation system of claim 11, wherein the finger extension interferes with rotation of the piston assembly, thereby ensuring that the magnet is positioned for operative communication with the sensor.

13. The shift fork actuation system of claim 12, wherein the piston assembly has an aperture at the slot, and further comprising:
a biasing element extending in the aperture and retained by the piston assembly within the slot and substantially occupying a clearance between the piston assembly and the finger extension when the finger extension is in the slot to further interfere with rotation of the piston assembly and stabilize the position of the magnet and the signal corresponding therewith.

14. The shift fork actuation system of claim 11, wherein the sensor pick-up is a Hall effect sensor.

15. A shift fork actuation system for controlling the position of a synchronizer, comprising:
an actuator housing defining a piston cavity;
an aluminum alloy piston assembly having three pistons with three different surface areas responsive to fluid pressure to establish three positions of the piston assembly within the piston cavity, wherein the piston assembly is formed with a slot extending partway therethrough;
a stopping mechanism interfering with one of the pistons to prevent movement of said one of the pistons past the stopping mechanism;
an elongated shift rail; wherein the piston assembly is generally axially centered with respect to the shift rail;
a shift fork extending from the shift rail in operative engagement with the synchronizer;
a finger extension spaced from the shift fork on the shift rail and extending from the shift rail into the slot such that movement of the pistons moves the finger extension to shift the shift fork and therefore the synchronizer to three different positions corresponding with the three positions of the piston assembly; and wherein the finger extension interferes with the piston assembly to substantially prevent rotation of the piston assembly.

16. The shift fork actuation system of claim 15, further comprising:
a position sensor assembly including:
a magnet embedded in the piston assembly;
a sensor pick-up positioned on the actuator housing in operative communication with the magnet and configured to provide a signal corresponding with the position of the magnet and thereby of the piston assembly and the corresponding synchronizer position.

17. The shift fork actuation system of claim 16, wherein the piston assembly has an aperture at the slot, and further comprising:
a biasing element extending in the aperture and retained by the piston assembly within the slot and substantially occupying a clearance between the piston assembly and the finger extension when the finger extension is in the slot to further prevent rotation of the piston assembly and stabilize the position of the magnet and the signal corresponding therewith.

* * * * *